United States Patent [19]

Fukuda et al.

[11] Patent Number: 4,824,224
[45] Date of Patent: Apr. 25, 1989

[54] LENS SYSTEM FOR A CATHODE RAY TUBE PROJECTION SYSTEM

[75] Inventors: Kyohei Fukuda, Fujisawa; Hiroki Yoshikawa, Hiratuka; Shigeru Mori, Chigasaki; Koji Hirata; Soichi Sakurai, both of Toksuka, all of Japan

[73] Assignee: Hitachi, Ltd., Tokyo, Japan

[21] Appl. No.: 948,251

[22] Filed: Dec. 31, 1986

[30] Foreign Application Priority Data

May 28, 1986 [JP] Japan .................. 61-121039

[51] Int. Cl.$^4$ .................. G02B 13/18; G02B 3/02; H04N 5/74; H04N 5/72
[52] U.S. Cl. .................. 350/432; 350/412; 358/239; 358/250
[58] Field of Search .................. 350/412, 432; 358/230, 358/239, 250

[56] References Cited

U.S. PATENT DOCUMENTS

| | | | |
|---|---|---|---|
| 2,552,672 | 5/1951 | Grey | 350/432 |
| 2,638,034 | 5/1953 | Wreathall | 350/412 |
| 4,300,817 | 11/1981 | Betensky | 350/412 |
| 4,348,081 | 9/1982 | Betensky | 350/412 |
| 4,526,442 | 7/1985 | Betensky et al. | 350/432 |
| 4,573,769 | 3/1986 | Clarke | 350/432 |
| 4,577,935 | 3/1986 | Yamakawa et al. | 350/432 |
| 4,620,773 | 11/1986 | Fukuda | 350/432 |
| 4,682,862 | 7/1987 | Moskovich | 350/432 |
| 4,685,774 | 8/1987 | Moskovich | 350/432 |
| 4,697,892 | 10/1987 | Betensky | 350/432 |
| 4,699,476 | 10/1987 | Clarke | 350/432 |
| 4,699,477 | 10/1987 | Clarke | 350/432 |

*Primary Examiner*—John K. Corbin
*Assistant Examiner*—Ronald M. Kachmarik
*Attorney, Agent, or Firm*—Saidman, Sterne, Kessler & Goldstein

[57] ABSTRACT

An improved lens system for a projection television is described. The lens system is designed to be used with a cathode ray tube having a face glass with an aspheric surface having phosphor elements mounted thereto. The aspheric surface of the face glass has its maximum radius at the optical axis and is of lesser radius outwardly thereof. From the screen, the lens system companies a first aspheric lens of relatively weak power, a second biconvex lens of relatively high positive power, a third aspheric lens of weak positive power and a fourth lens having a concave face on its screen sider and of relatively large negative power.

28 Claims, 3 Drawing Sheets

LENS SYSTEM FOR A CATHODE RAY TUBE PROJECTION SYSTEM

BACKGROUND OF THE INVENTION

1. Field of the Invention

This invention relates to a lens system for projection of an enlargement of an image appearing on a cathode ray tube onto a projection screen.

2. Related Art

U.S. Pats. Nos. 4,300,817, 14,348,081 and 4,526,442 to Betensky all disclose a lens system which employs lenses having aspheric surfaces for projection of an image formed on a cathode-ray tube (CRT) onto a projection screen. This lens system produces an enlarged image of high brightness. However, the length of the beam path from the face glass of the CRT to the screen in a projection system using the lens system of Betensky is too long to be suitable for a compact projection set. That is, the Betensky system provides insufficient enlargement.

In order to increase the enlargement and to shorten the length of the beam path compared to the Betensky design, a lens system has been constructed which comprises an aspherical lens of relatively weak power near the image side (i.e. toward the screen), a biconvex lens providing most of the enlargement of the lens system, an aspheric convex lens of relatively weak power, a concave lens of relatively large negative power, and a CRT with a face glass having an aspheric surface on which the phosphor elements are mounted. The aspheric surface is of minimum diameter on the optical axis. This lens system is disclosed in copending U.S. patent application, Ser. No. 911,070, filed Sept. 24, 1986, (the "'070 application") incorporated herein by reference.

The lens system described in the copending '070 application provides a relatively short distance, approximately 700 mm, between the screen and the lens. The inventors have found that the lens system disclosed in the '070 application tends to produce a phantom image, which seems to be caused by a multiple reflection of the light beam from the phosphors of the CRT, particularly in the brighter portions of the image. Since the brightness of the phantom image is about $1.3 \times 10^{-3}$ of the brightness of the image itself, the phantom image is not normally visually distracting. However, the phantom image caused in response to a white vertical bar in the image can be distracting, especially when the remainder of the image and the room in which the television is located are relatively dark.

SUMMARY OF THE INVENTION

The present invention provides an optical system which reduces the phantom image formed by multiple reflection. The invention comprises an optical system for enlarging an image formed on a face glass of a CRT and projecting the enlarged image onto a screen. The optical system of the invention comprises, beginning at the screen side, a first lens with an aspherical face of relatively weak power, a second biconvex lens for providing the major portion of the magnification of the lens system, a third lens with an aspheric face and of relatively weak positive power, and a fourth lens with a concave face toward the screen and being of relatively large negative power. The rear surface of the face glass of the CRT is aspheric; its maximum radius is on the optical axis. This results in reduced multiple reflection of light, particularly in the central portion of the concave face of the fourth lens.

DESCRIPTION OF THE PREFERRED EMBODIMENT

Figure 1:
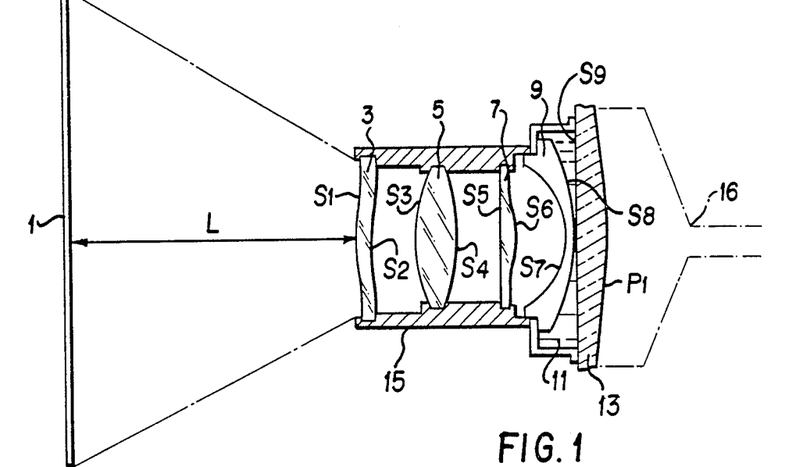
FIG. 1 is a cross-sectional view of a projection optical system according to the present invention.

A projection optical system according to the invention is illustrated in FIG. 1. The system comprises a screen 1, a first lens 3, a second lens 5, a third lens 7, a fourth lens 9, a cooling liquid 11, the face glass 13 of a CRT 16, and a lens barrel 15. In one commercial embodiment, the optical system may be configured to exhibit optimal performance when the image produced in a CRT 16 of 4.5 inch size is enlarged on the screen to 45 inch size, i.e., when the magnification is 10. Distance L between screen 1 and first lens 3, which is the so-called projection distance, is approximately 700 mm. The picture angle in this optical system is approximately 40 degrees. Clearly, other embodiments are within the scope of the invention.

First lens 3 is relatively weak and has an aspherical shape to eliminate spherical aberration, which, as is known, is dependent on the aperture of the lens system. Second lens 5 is positive and is relatively strong, providing a major portion of the magnification of the lens system. Second lens 5 is glass in order to decrease the focus drift otherwise caused by temperature change. Third lens 7 has an aspherical shape to eliminate high order coma and astigmatism. The power of both the first and third lenses 3 and 7 is minimized to minimize the difference in thickness between the center and the periphery of the lenses, so that these lenses may conveniently be formed of plastic material. Lenses 3 and 7 may be formed of polymethylmethacrylate (PMMA). Fourth lens 9 is provided to correct the field curvature and distortion, is negative and is relatively strong. In first and second embodiments of the invention (shown in FIG. 1 and described in detail in Tables 1 and 2 below), fourth lens 9 has a convex shape at the side facing CRT 16 to allow it to be made of a plastic material, such as PMMA. In a third embodiment of the invention (as partially shown in FIG. 2 and described by Table 3), fourth lens 9 is glass and has a flat or relatively flat surface on its side facing the CRT 16. The cooling fluid may be polyethylene glycol (PEG) - 200.

Figure 2:
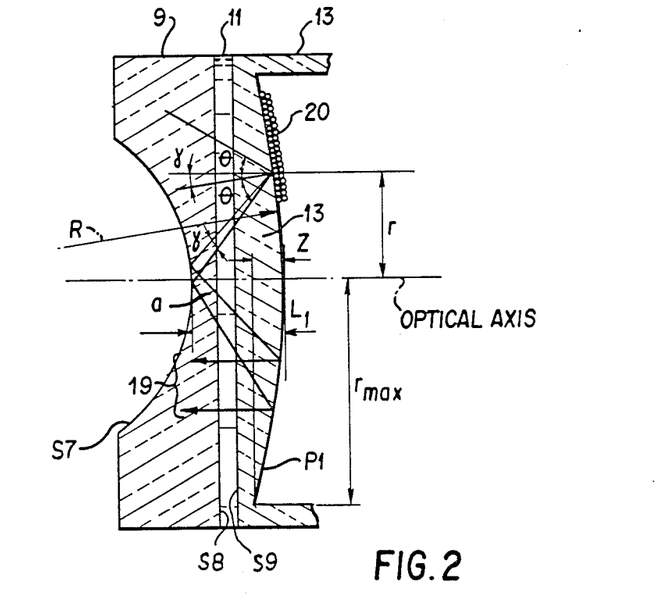
FIG. 2 is an enlarged cross-sectional view of one part of the lens system of the invention.

Face glass 13 of CRT 16 has an inner surface P1 on which conventional phosphor elements 20 are mounted, as shown in detail in FIG. 2. Surface P1 is aspheric to correct the field curvature and distortion, especially their higher order components. According to an important aspect of the present invention, the radially outer portions of the face glass 13 are of a smaller radius than the central portion. The face glass 13 for the CRT 16 can be made by a molding operation, even though the face glass 13 is aspheric.

Figure 3:
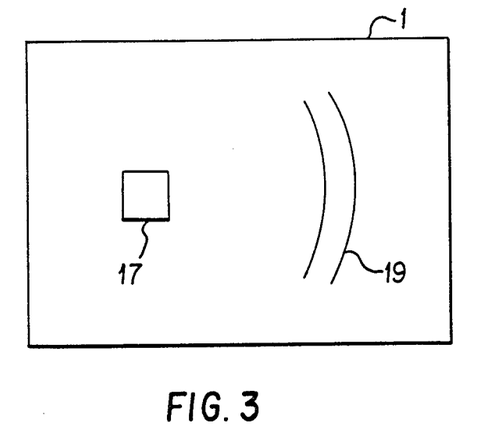
FIG. 3 is one example of an image reproduced on a screen and exhibiting a phantom image.

As shown in FIG. 3, a white square in the image on face glass 13 of CRT 16 when projected onto screen 1 appears as a square 17 which is white, i.e. whose brightness is high, at the left side of screen 1. A crescent shaped phantom image 19 of square 17 also appears on the right side of screen 1; the brightness of the phantom image 19 is much less than that of square 17. However, when the square 17 is extended vertically, that is when a white vertical bar appears in the image, phantom image 19 is brightened and extended enough to be recognized by a human eye, particularly when the remainder of the image and the room in which the television is located are dim. The phantom image then becomes visually distracting.

FIG. 2 illustrates the mechanism of the generation of the crescent shaped phantom image 17. The boundary S8 between fourth lens 9 and cooling liquid 11 may be planar, as shown in FIG. 2, may be of relatively large radius, or may be relatively sharply curved as shown in FIG. 1, depending on its material, as discussed below. In each case, light emitted from phosphor elements 20 diverges in all directions, and therefore enters face glass 13 at angles between $\pm 90°$ with respect to a line normal to the surface P1 of the face glass 13. The ray path of light which enters face glass 13 then diverges by angles $\pm \theta$ due to refraction in the face glass 13. The divergent angle $\pm \theta$ is defined by the following equation (1).

$$\theta = \sin^{-1}(1/NG) \quad (1)$$

where NG is the refractive index of the glass of face glass 13.

The ray path in face glass 13 varies between $-(\theta+\gamma)$ and $(p74 - \gamma)$ where $\gamma$ is the angle between the optical axis of the lens system (that is, its centerline) and the normal axis (that is, a line normal to the surface of the face glass 13 at the point where the ray enters the face glass 13). The ray path of the light then continues along an essentially straight line through face glass 13, cooling liquid 11, and fourth lens 9, because the refraction indices of these optical elements are very similar (1.4–1.6).

Most of the light beam which passes through fourth lens 9 then passes into the air and is projected to form the real image 17. However, a portion a of the light beam in a central portion of the fourth lens 9 is totally reflected from surface S7 toward the phosphor elements 20 on surface P1, and is diffusely reflected toward screen 1 again. This doubly reflected portion produces phantom image 19.

If it is assumed that the central portion of surface P1 is perpendicular to the optical axis of the lens system and that the refractive index NP of the fourth lens is approximately equal to refractive index NG of face glass 13, the critical angle of fourth lens 9 for total internal reflection is then nearly equal to $\theta$. For this reason the light beam at angles between $\theta$ and $\theta + \gamma$ from phosphor 20 produces the phantom image 19.

The phantom image 19 is caused by the light beam from a phosphor element 20 positioned a distance r from the optical axis. Distance r is represented by the following equation (2):

$$r = L1 \tan(\sin^{-1}(1/N)) \quad (2)$$

where $N = NG = NP$, and where L1 is the distance between surface P1, on which are mounted phosphor elements 20, and face S7 of fourth lens 9, measured along the optical axis.

Other reflections at other faces of the lenses of the lens system and from the inner surface of lens barrel 15 can also produce phantom images. The ultimate image quality is satisfactory if the brightness of the phantom image 19 produced corresponding to a vertical bar in the image is reduced generally to the brightness level of other phantom images.

Angle $\gamma$ determines the amount of the light which is reflected at the central portion of surface S7 to produce the phantom image. Angle $\gamma$ as indicated above depends on the radius of curvature R of the surface P1 of the face glass 13 on which phosphor elements 20 are mounted, because $\gamma$ represents the curvature of the surface P1 at a distance r from the optical axis. Therefore, the brightness of the phantom image 19 is reduced as radius R increases.

While evaluation of the image quality is somewhat subjective, the inventors have found that the brightness of phantom image 19 is generally permissible if the minimum radius of curvature R of surface P1 is at least 250 mm, that is, if angle $\gamma$ at a distance r from the optical axis is less than r/250, and that good suppression of the phantom image 19 occurs when R=500 mm, that is, $\gamma(r) < r/500$.

Figures 4, 5:
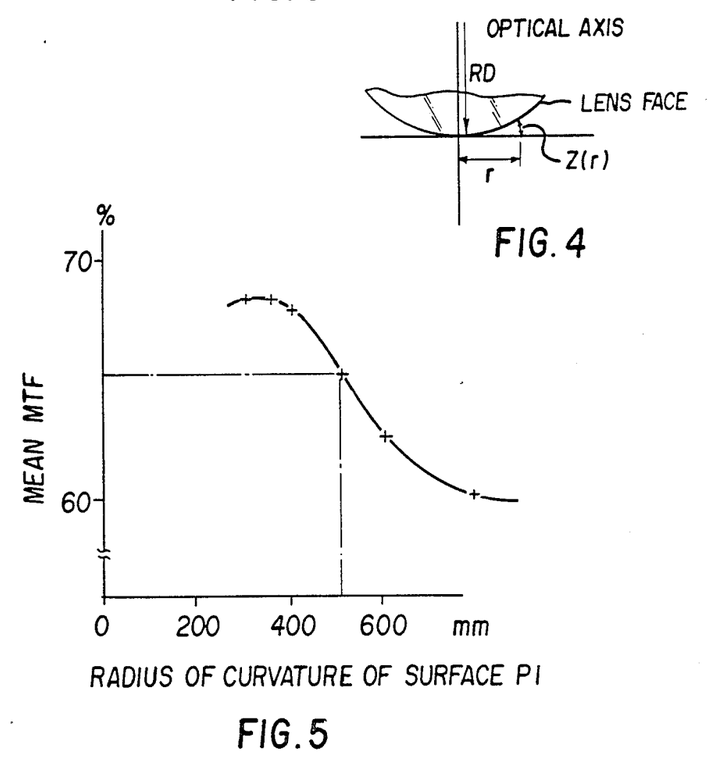
FIG. 4 is a diagram illustrating terms used in the definition of the aspheric lens shapes.
FIG. 5 is a diagram showing the relationship between the radius of curvature of the surface of the face glass of a CRT on which phosphors are mounted and its mean MTF.

The inventors have also found that the mean Modulation Transfer Function (MTF), that is, the resolution of the lens system, also depends on the radius of curvature R of surface P1. This dependence is illustrated in FIG. 5, which charts the mean MTF of an image of 2 lines per millimeter on the viewing screen 1, versus the minimum radius of curvature R of surface P1 of face glass 13. This data was obtained by testing a lens system according to the invention, the specifics of which are provided below. The mean MTF is a mean value of MTFs sampled at several points along a diagonal line between a center point and an outermost point of screen 1. As shown in FIG. 5, the MTF of the lens according to the invention is permissible if the minimum radius of curvature R of surface P1 is no more than about 500 mm, and it has a maximum value where the minimum radius of curvature R is approximately 350 mm.

FIG. 2 illustrates the definition of a deviation z, which is the distance along the optical axis from a plane including the outermost portion of surface $P_1$, that is, at a distance $r_{max}$ from the optical axis, to surface $P_1$. The MTF appears to be permissible if deviation z is greater than $r_{max}^2/2R$. Variation in the mean MTF with variation in radius R is mainly influenced by the MTF of the outer portions of the lens system, since the MTF of the center portion of face glass 13 does not vary greatly with the radius of curvature R of the surface P1.

Specifics of the lenses of a lens system according to the invention are as indicated in Tables 1A and 1B. Table 1A follows:

TABLE 1A

| | | Paraxial System | | | |
|---|---|---|---|---|---|
| | | Radius of Curvature (RD) (mm) | Aperture Radius (mm) | Space Between Faces (mm) | Refractive Index |
| Screen | | ∞ | 600 | | |
| First Lens | $S_1$ | | | 701.0 | 1.0 |
| | $S_2$ | 82.0748 | 40.0 | | |
| | | | | 7.049 | 1.4936 |
| | | 102.395 | 34.7 | | |
| Second | $S_3$ | | | 18.754 | 1.0 |

TABLE 1A-continued

| | | Paraxial System | | | |
|---|---|---|---|---|---|
| | | Radius of Curvature (RD) (mm) | Aperture Radius (mm) | Space Between Faces (mm) | Refractive Index |
| Lens | S4 | 72.846 | 34.9 | | |
| | | | | 18.3 | 1.59096 |
| | | −115.364 | 34.4 | | |
| Third | S5 | | | 22.778 | 1.0 |
| Lens | S6 | 918.544 | 34.5 | | |
| | | | | 6.012 | 1.4936 |
| | | −119.128 | 34.5 | | |
| Fourth | S7 | | | 26.6 | 1.0 |
| Lens | S8 | −38.728 | 35.7 | | |
| | | | | 3.0 | 1.4936 |
| | | −45.0 | 38.5 | | |
| Cooling Liquid | | ∞ | 60.0 | 1.94 | 1.4578 |
| Glass (Surface P1) | | −500.0 | 12.7 60.0 | 1.5401 | |

Table 1A shows the data for the spherical portions of the lenses making up the projection lens system of the invention. Table 1B shows the data for the aspherical portions of the lenses. As is evident from Table 1A, screen 1 has an infinite radius of curvature, that is, screen 1 is flat. The aperture radius (effective radius) of the screen 1 is 600 mm. The distance L between screen 1 and surface S1 at first lens 3 is 701.0 mm, and the refractive index of the air therebetween is 1.0.

Table 1A also shows, for example, that face S1 of first lens 3 has a radius of curvature of 82.0748 mm. The aperture radius of first lens 3 is 40.0 mm. The distance along the optical axis between lens faces S1 and S2, that is, the thickness of first lens 3 is 7.049 mm. The refractive index of the first lens 3 is 1.4936.

In the same way, Table 1A shows that the radius of surface P1 of face glass 13 to which phosphors 20 are attached is 500 mm at its center; its aperture radius is 60 mm. Face glass 13 is 12.7 mm thick on the optical axis, and is of a material having a refractive index of 1.5401. Other data appearing in Table 1 can be similarly interpreted.

Table 1B gives the aspherical coefficients CC, AD, AC, AF and AG for faces S1 and S2 of first lens 3, faces S5 and S6 of third lens 7, face S7 of fourth lens 9, and surface P1 of face glass 13. The other optical surfaces of the optical system of the invention are not aspheric. The aspherical coefficients shown in Table 1B are used in accordance with the following equation (3) to define the shapes of the individual surfaces:

$$Z(r) = \frac{r^2/RD}{1 + \sqrt{1 - (1 + CC)(r^2/RD^2)}} + ADr^4 + AEr^6 + AFr^8 + AGr^{10} \quad (3)$$

Figure 6:
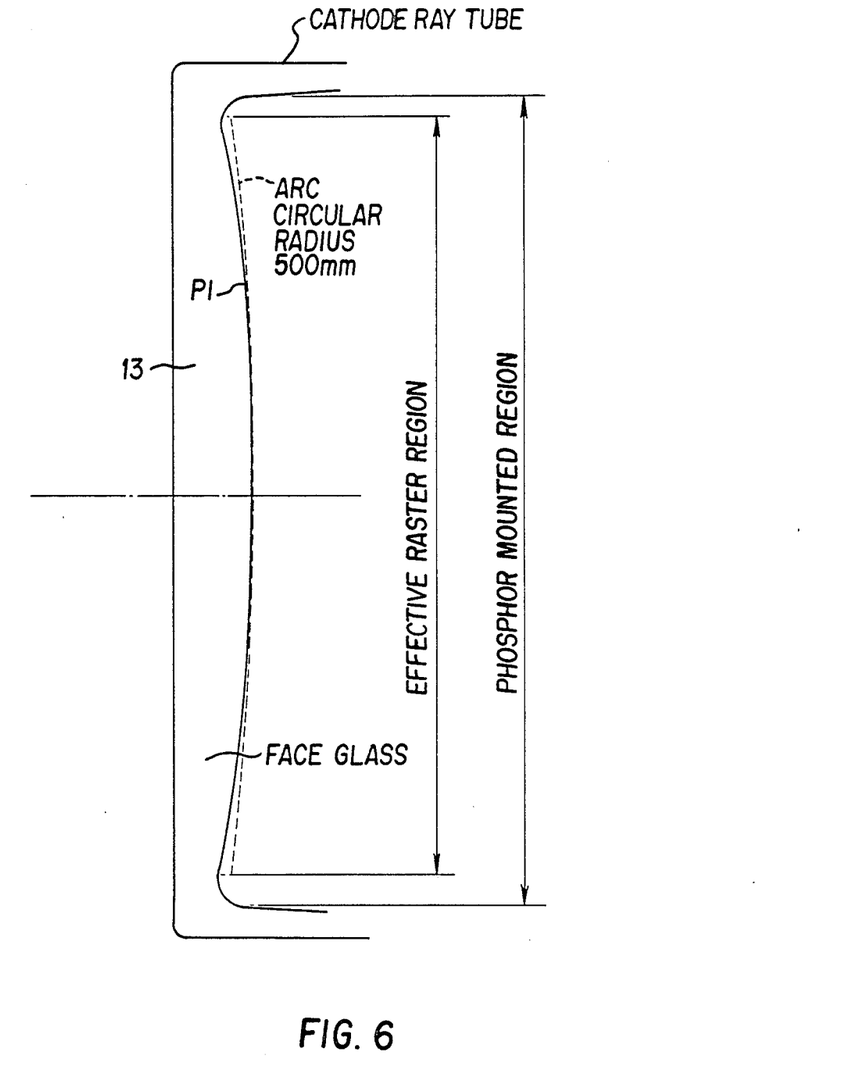
FIG. 6 is a schematic illustration of surface P1 based on the data in Tables 1A and 1B.

FIG. 6 is an illustration of surface P1 generated by plotting the data shown in Tables 1A and 1B.

FIG. 4 illustrates the meaning of the terms Z(r), r and RD. Z(r) represents the departure in mm of the lens face from a plane tangent to the lens surface at the optical axis at a distance r from the optical axis. RD is the radius of the lens surface at the optical axis. CC is a conic constant or another surface of revolution.

Table 1B gives parameters which may be used in conjunction with Equation (3) above to define various lenses of the lens system according to the invention.

Since second lens 3 is spherical all of the aspherical coefficients of lens 3 are zero.

In this example γ is 0.003 radian, which is enough to suppress the crescent shaped phantom image 19. Deviation z is 5.2 mm, and the minimum radius of curvature of surface D1 is 350 mm. In this embodiment the radius of curvature of the surface of face glass 13 to which phosphors 20 are attached decreases from 500 mm to 350 mm radially outwardly along the surface P1.

TABLE 1B:

| | | | Aspherical Coefficients | | | |
|---|---|---|---|---|---|---|
| | | CC | AD ($\times 10^{-6}$) | AE ($\times 10^{-9}$) | AF ($\times 10^{-13}$) | AG ($\times 10^{-16}$) |
| First Lens | S1 | −2.95877 | −1.3965 | −3.2955 | 24.863 | −5.4409 |
| | S2 | 0.961337 | −1.2618 | −3.0485 | 30.558 | −7.4994 |
| Third Lens | S5 | −39658.1 | 1.541 | −2.7466 | 36.1997 | 16.381 |
| | S6 | −5.38827 | 1.354 | −0.81165 | 25.694 | −11.625 |
| Fourth Lens | S7 | −0.008717 | −0.80977 | 1.7058 | −9.8745 | 5.0738 |
| Surface P1 | P1 | 0 | −1.2329 | 5.9393 | −0.97263 | 0.046157 |

Tables 2 and 3, comprising respectively Tables 2A and 2B and 3A and 3B, show data describing other lenses according to the invention. These Tables are to be interpreted as indicated in connection with Tables 1A and 1B.

In the example shown in Table 3, fourth lens 9 is of glass and is spherical, so that its aspherical coefficients are zero. In this embodiment of the lens system of the invention, the cooling liquid was polyethylene glycol (PEG) 200 mixed with water in the ratio 4:1 by weight.

TABLE 2A

| | | Paraxial System | | | |
|---|---|---|---|---|---|
| | | Radius of Curvature (RD) (mm) | Aperture Radius (mm) | Space Between Faces (mm) | Refractive Index |
| Screen | | ∞ | 600 | | |
| First | S1 | | | 701.0 | 1.0 |
| Lens | S2 | 81.8549 | 40.0 | | |
| | | | | 7.0487 | 1.4936 |
| | | 102.395 | 34.7 | | |
| Second | S3 | | | 18.75 | 1.0 |
| Lens | S4 | 72.8457 | 34.9 | | |
| | | | | 18.3 | 1.59096 |
| | | −115.364 | 34.4 | | |
| Third | S5 | | | 22.778 | 1.0 |
| Lens | S6 | 918.5438 | 34.5 | | |
| | | | | 6.012 | 1.4936 |
| | | −119.1283 | 34.5 | | |
| Fourth | S7 | | | 26.4 | 1.0 |
| Lens | S8 | −39.3277 | 35.7 | | |
| | | | | 3.0 | 1.4936 |
| | | −45.0 | 38.5 | | |
| Cooling Liquid | | ∞ | 60.0 | 1.94 | 1.4578 |
| Glass (Surface P1) | | −500.0 | 60.0 | 12.7 | 1.5401 |

TABLE 2B

| | | | Aspherical Coefficients | | | |
|---|---|---|---|---|---|---|
| | | CC | AD ($\times 10^{-6}$) | AE ($\times 10^{-10}$) | AF ($\times 10^{-13}$) | AG ($\times 10^{-16}$) |
| First | $S_1$ | −2.95877 | −1.3480 | −33.378 | 24.908 | −5.4175 |
| Lens | $S_2$ | 0.96134 | −1.2618 | −30.485 | 30.558 | −7.4994 |
| Third | $S_5$ | −39658.1 | 1.541 | −27.466 | 36.1997 | 16.381 |
| Lens | $S_6$ | −5.38827 | 1.1922 | −5.1249 | 22.719 | −10.287 |
| Fourth Lens | $S_7$ | −0.008717 | −1.70619 | 21.11 | −6.6876 | 2.0308 |
| Surace P1 | P1 | 0 | −1.2329 | 5.9393 | −0.97263 | 0.046157 |

TABLE 3A

| | | Paraxial System | | | |
|---|---|---|---|---|---|
| | | Radius of Curvature (RD) (mm) | Aperture Radius (mm) | Space Between Faces (mm) | Refractive Index |
| Screen | | ∞ | 600 | | |
| First | $S_1$ | | | 701.0 | 1.0 |
| Lens | $S_2$ | 82.0748 | 40.0 | | |
| | | | | 7.049 | 1.4936 |
| | | 102.395 | 34.7 | | |
| Second | $S_3$ | | | 18.754 | 1.0 |
| Lens | $S_4$ | 72.846 | 34.0 | | |
| | | | | 18.3 | 1.59096 |
| | | −115.364 | 30.9 | | |
| Third | $S_5$ | | | 22.778 | 1.0 |
| Lens | $S_6$ | 918.544 | 34.5 | | |
| | | | | 6.012 | 1.4936 |
| | | −124.624 | 34.5 | | |
| Fourth | $S_7$ | | | 26.709 | 1.0 |
| Lens | $S_8$ | −40.485 | 35.4 | | |
| | | | | 3.0 | 1.51827 |
| | | −120.0 | 50.0 | | |
| Cooling Liquid | | ∞ | 60.0 | 1.939 | 1.41 |
| Glass (Surface P1) | | −500.0 | 60.0 | 12.7 | 1.5401 |

TABLE 3B

| | | | Aspherical Coefficients | | | |
|---|---|---|---|---|---|---|
| | | CC | AD ($\times 10^{-6}$) | AE ($\times 10^{-9}$) | AF ($\times 10^{-13}$) | AG ($\times 10^{-16}$) |
| First | $S_1$ | −2.95877 | −1.3965 | −3.2955 | 24.863 | −5.4410 |
| Lens | $S_2$ | 0.961337 | −1.2618 | −3.0485 | 30.558 | −7.4994 |
| Third | $S_5$ | −39658.1 | 1.541 | −2.7466 | 36.20 | −1.6381 |
| Lens | $S_6$ | −5.3883 | 0.6305 | 1.2760 | 2.6164 | −2.7807 |
| Fluorescent Face | P1 | 0 | −1.2329 | 0.59393 | −0.97263 | 0.046157 |

While a preferred embodiment of the invention has been described, numerous modifications and improvements thereto are within the skill of the art. The above disclosure therefore should not be taken to limit the present invention, which is defined only by the following claims.

We claim:

1. An optical system for enlarging an image produced on face glass of a cathode ray tube and projecting the image onto a screen, comprising from its screen side:
   a first aspheric lens of relatively weak power;
   a second biconvex lens for providing the major portion of the enlargement provided by the optical system;
   a third aspheric lens of relatively weak positive power; and
   a fourth lens with a concave face on its screen side of relatively large negative power;
   wherein a surface of said face glass of said cathode ray tube to which phosphor elements are mounted is aspheric and wherein the radius of curvature of said surface is greatest at the optical axis and is less radially outward thereof to reduce the amount of light from said phosphor elements which undergoes total internal reflection from a central portion of said concave face of said fourth lens.

2. The optical system of claim 1, wherein an angle $\gamma$ between the optical axis and a line normal to the surface of the face glass at a distance r from the optical axis is less than r/250 in a central portion of said surface.

3. The optical system of claim 2, wherein angle $\gamma$ is less than r/500.

4. The optical system of claim 1, wherein z is greater than $r_{max}^2/2R$ wherein the distance z is measured along the optical axis between said surface of said face glass and a plane including the outmost periphery of said surface, the distance from the optical axis to the outmost periphery being $r_{max}$, and wherein R is the minimum radius of said surface of said face glass.

5. The optical system of claim 1, wherein the aspheric surfaces are defined by the following relationship:

$$Z(r) = \frac{r^2/RD}{1 + \sqrt{1 - (1 + CC)(r^2/RD^2)}} + ADr^4 + AEr^6 + AFr^8 + AGr^{10}$$

where Z(r) represents the departure in mm of the lens face from a plane tangent to the lens surface at the optical axis at a distance r from the optical axis, RD is the radius of the lens surface at the optical axis, CC is the conic constant, and AD, AE, AF and AG are constants for the surface.

6. The optical system of claim 5, having a projection angle of approximately 40°, described substantially as follows:

Data For Spherical Portions

| | | Radius of Curvature (RD) (mm) | Aperture Radius (mm) | Space Between Faces (mm) | Refractive Index |
|---|---|---|---|---|---|
| Screen | | ∞ | 600 | 701.0 | 1.0 |
| First | $S_1$ | 82.0748 | 40.0 | | |
| Lens | $S_2$ | | | 7.049 | 1.4936 |
| | | 102.395 | 34.7 | | |
| Second | $S_3$ | | | 18.754 | 1.0 |
| Lens | $S_4$ | 72.846 | 34.9 | | |

-continued

|  |  | Radius of Curvature (RD) (mm) | Aperture Radius (mm) | Space Between Faces (mm) | Refractive Index |
|---|---|---|---|---|---|
|  |  | −115.364 | 34.4 | 18.3 | 1.59096 |
| Third | S$_5$ |  |  | 22.778 | 1.0 |
| Lens | S$_6$ | 918.544 | 34.5 |  |  |
|  |  | −119.128 | 34.5 | 6.012 | 1.4936 |
| Fourth | S$_7$ |  |  | 26.6 | 1.0 |
| Lens | S$_8$ | −38.728 | 35.7 |  |  |
|  |  |  |  | 3.0 | 1.4936 |
|  |  | −45.0 | 38.5 |  |  |
| Cooling |  |  |  | 1.94 | 1.4578 |
| Liquid |  | ∞ | 60.0 |  |  |
| Glass |  |  |  | 12.7 | 1.5401 |
| (Surface P1) |  | −500.0 | 60.0 |  |  |

Aspherical Coefficients

|  |  | CC | AD (× 10$^{-6}$) | AE (× 10$^{-9}$) | AF (× 10$^{-13}$) | AG (× 10$^{-16}$) |
|---|---|---|---|---|---|---|
| First | S$_1$ | −2.95877 | −1.3965 | −3.2955 | 24.863 | −5.4409 |
| Lens | S$_2$ | 0.961337 | −1.2618 | −3.0485 | 30.558 | −7.4994 |
| Third | S$_5$ | −39658.1 | 1.541 | −2.7466 | 36.1997 | 16.381 |
| Lens | S$_6$ | −5.38827 | 1.354 | −0.81165 | 25.694 | 11.625 |
| Fourth Lens | S$_7$ | −0.008717 | −0.80977 | 1.7058 | −9.8745 | 5.0738 |
| Surface P1 | P1 | 0 | −1.2329 | 5.9393 | −0.97263 | 0.046157 |

7. The optical system of claim 5, having a projection angle of approximately 40°, described substantially as follows:
Data For Spherical Portions

|  |  | Radius of Curvature (RD) (mm) | Aperture Radius (mm) | Space Between Faces (mm) | Refractive Index |
|---|---|---|---|---|---|
| Screen |  | ∞ | 600 | 701.0 | 1.0 |
| First | S$_1$ | 81.8549 | 40.0 |  |  |
| Lens | S$_2$ |  |  | 7.0487 | 1.4936 |
|  |  | 102.395 | 34.7 |  |  |
| Second | S$_3$ |  |  | 18.75 | 1.0 |
| Lens | S$_4$ | 72.8457 | 34.9 |  |  |
|  |  |  |  | 18.3 | 1.59096 |
|  |  | −115.364 | 34.4 |  |  |
| Third | S$_5$ |  |  | 22.778 | 1.0 |
| Lens | S$_6$ | 918.5438 | 34.5 |  |  |
|  |  |  |  | 6.012 | 1.4936 |
|  |  | −119.1283 | 34.5 |  |  |
| Fourth | S$_7$ |  |  | 26.4 | 1.0 |
| Lens | S$_8$ | −39.3277 | 35.7 |  |  |
|  |  |  |  | 3 0 | 1.4936 |

|  |  | Radius of Curvature (RD) (mm) | Aperture Radius (mm) | Space Between Faces (mm) | Refractive Index |
|---|---|---|---|---|---|
|  |  | −45.0 | 38.5 |  |  |
| Cooling |  |  |  | 1.94 | 1.4578 |
| Liquid |  | ∞ | 60.0 |  |  |
| Glass |  |  |  | 12.7 | 1.5401 |
| (Surface P1) |  | −500.0 | 60.0 |  |  |

Aspherical Coefficients

|  |  | CC | AD (× 10$^{-6}$) | AE (× 10$^{-9}$) | AF (× 10$^{-13}$) | AG (× 10$^{-16}$) |
|---|---|---|---|---|---|---|
| First | S$_1$ | −2.95877 | −1.3480 | −33.378 | 24.908 | −5.4175 |
| Lens | S$_2$ | 0.96134 | −1.2618 | −30.485 | 30.558 | −7.4994 |
| Third | S$_5$ | −39658.1 | 1.541 | −27.466 | 36.1997 | 16.381 |
| Lens | S$_6$ | −5.38827 | 1.922 | −5.1249 | 22.719 | −10.287 |
| Fourth Lens | S$_7$ | −0.008717 | −1.70619 | 21.11 | −6.6876 | 2.0308 |
| Surface P1 | P1 | 0 | −1.2329 | 5.9393 | −0.97263 | 0.046157 |

8. The optical system of claim 5, having a projection angle of approximately 40°, described substantially as follows:
Data For Special Portions

|  |  | Radius of Curvature (RD) (mm) | Aperture Radius (mm) | Space Between Faces (mm) | Refractive Index |
|---|---|---|---|---|---|
| Screen |  | ∞ | 600 | 701.0 | 1.0 |
| First | S$_1$ | 82.0748 | 40.0 |  |  |
| Lens | S$_2$ |  |  | 7.049 | 1.4936 |
|  |  | 102.395 | 34.7 |  |  |
| Second | S$_3$ |  |  | 18.754 | 1.0 |
| Lens | S$_4$ | 72.846 | 34.0 |  |  |
|  |  |  |  | 18.3 | 1.59096 |
|  |  | −115.364 | 30.9 |  |  |
| Third | S$_5$ |  |  | 22.778 | 1.0 |
| Lens | S$_6$ | 918.544 | 34.5 |  |  |
|  |  |  |  | 6.012 | 1.4936 |
|  |  | −124.624 | 34.5 |  |  |
| Fourth | S$_7$ |  |  | 26.709 | 1.0 |
| Lens | S$_8$ | −40.485 | 35.4 |  |  |
|  |  |  |  | 3.0 | 1.51827 |
|  |  | −120.0 | 50.0 |  |  |
| Cooling |  |  |  | 1.939 | 1.41 |
| Liquid |  | ∞ | 60.0 |  |  |
| Glass |  |  |  | 12.7 | 1.5401 |
| (Surface P1) |  | −500.0 | 60.0 |  |  |

Aspherical Coefficients

|  |  | CC | AD (× 10$^{-6}$) | AE (× 10$^{-9}$) | AF (× 10$^{-13}$) | AG (× 10$^{-16}$) |
|---|---|---|---|---|---|---|
| First | S$_1$ | −2.95877 | −1.3965 | −3.2955 | 24.863 | −5.4410 |
| Lens | S$_2$ | 0.961337 | −1.2618 | −3.0485 | 30.558 | −7.4994 |
| Third | S$_5$ | −39658.1 | 1.541 | −2.7466 | 36.20 | −1.6381 |
| Lens | S$_6$ | −5.3883 | 0.6305 | 1.2760 | 2.6164 | −2.7807 |
| Fluorescent | P1 | 0 | −1.2329 | 5.9393 | −0.97263 | 0.046157 |

| | -continued | | | |
|---|---|---|---|---|
| | AD ($\times 10^{-6}$) | AE ($\times 10^{-9}$) | AF ($\times 10^{-13}$) | AG ($\times 10^{-16}$) |
| Face | | | | |

9. An optical system for projecting an image, comprising;
a cathode ray tube having an face glass, said face glass having a convex surface to which are mounted a plurality of phosphor elements, said surface of said face glass to which said phosphor elements are mounted being aspheric and of greatest radius at the optical axis and lesser radius radially outward thereof;
a first aspheric lens of relatively weak power;
a second biconvex lens for providing the major portion of the enlargement provided by the lens system;
a third aspheric lens of relatively weak positive power; and
a fourth lens with a concave face on its screen side of relatively large negative power.

10. The optical system of claims 9, wherein an angle $\gamma$ formed between the optical axis and a line normal to the surface of the face glass to which the phosphor elements are mounted at a distance r from the optical axis is less than r/250.

11. The optical system of claim 10 wherein $\gamma$ is less than r/500.

12. The optical system of claim 9, wherein the distance z along the optical axis between the surface of said face glass to which said phosphor elements are mounted and a plane including the outermost surface of said face glass at a distance $r_{max}$ from the optical axis is less than $r_{max}2/1000$, and wherein z and $r_{max}$ are measured in mm.

13. The optical system of claim 6 further comprising a quantity of a cooling liquid interposed between said fourth lens and said face glass.

14. A projection television, comprising a cathode ray tube having a face glass, an internal surface of said face glass to which phosphor elements are mounted being convex and aspheric, wherein the radius of said face glass is greatest at its center portion and decreases radially outwardly thereof, and a projection optical system, said projection optical system comprising a lens means to project an image formed on said face glass onto a projection screen, wherein said lens means comprises from the screen:
a first aspheric lens;
a second biconvex positive lens;
a third aspheric positive lens; and
a fourth negative lens.

15. The television of claim 14,
wherein said first lens is of relatively weak power, said second lens provides the major portion of the enlargement provided by the projection optical system, the third lens is of relatively weak positive power and the fourth lens is of relatively large negative power.

16. The lens system of claim 14, wherein an angle $\gamma$, formed between the optical axis and a line normal to the surface of said face glass to which said phosphor elements are attached, at a distance r from the optical axis, is less than r/250.

17. The television of claim 14 wherein $\gamma$ is less than r/500.

18. A projection television, comprising a cathode ray tube having a face glass, an internal surface of said face glass to which phosphor elements are mounted being convex and aspheric, wherein the radius of said face glass is greatest at its center portion and decreases radially outwardly thereof, and a projection optical system, said projection optical system comprising a lens means to project an image formed on said face glass onto a projection screen, wherein the distance z along the optical axis between the surface of the face glass to which said phosphor elements are mounted in a plane including the outermost periphery of said surface of said face glass, at a distance $r_{max}$ from the optical axis is less than $r_{max}2/1000$, and wherein z and $r_{max}$ are measured in like units.

19. A projection television, comprising a cathode ray tube having a face glass, an internal surface of said face glass to which phosphor elements are mounted being convex and aspheric, wherein the radius of said face glass is greatest at its center portion and decreases radially outwardly thereof, and a projection optical system, said projection optical system comprising a lens means to project an image formed on said face glass onto a projection screen, wherein a quantity of a cooling liquid is interposed between said face glass and said lens means.

20. An optical system for projecting an image, comprising:
a cathode ray tube having a face glass, said face glass having a convex surface to which are mounted a plurality of phosphor elements, said surface of said face glass to which said phosphor elements are mounted being aspheric;
a first aspheric lens of relatively weak power;
a second biconvex lens for providing the major portion of the enlargement provided by the lens system;
a third aspheric lens of relatively weak positive power; and
a fourth lens with a concave face on its screen side of relatively large negative power.

21. An optical system for enlarging an image produced on a face glass of a cathode ray tube and projecting the image onto a screen, comprising from its screen side:
a first aspheric lens of relatively weak power;
a second biconvex lens for providing the major portion of the enlargement provided by the optical system;
a third aspheric lens of relatively weak positive power; and
a fourth lens with a concave face on its screen side of relatively large negative power;
wherein a surface of said face glass of said cathode ray tube which phosphor elements are mounted is aspheric and the radius of curvature of said surface is greatest at the optical axis and is less radially outward thereof to reduce the amount of light from said phosphor elements which undergoes total internal reflection from a central portion of said concave face of said fourth lens, and wherein an angle $\gamma$ between the optical axis and a line normal to the surface of the face glass at a distance r from the optical axis is less than r/250 in a central portion of said surface.

22. The optical system of claim 21, wherein angle γ is less than r/500.

23. An optical system for projecting an image, comprising:
   a cathode ray tube having a face glass, said face glass having a convex surface to which are mounted a plurality of phosphor elements, said surface of said face glass to which said phosphor elements are mounted being aspheric and of greatest radius at the optical axis and lesser radius radially outward thereof;
   a first aspheric lens of relatively weak power;
   a second biconvex lens for providing the major portion of the enlargement provided by the lens system;
   a third aspheric lens of relatively weak positive power; and
   a fourth lens with a concave face on its screen side of relatively large negative power;
   wherein an angle γ formed between the optical axis and a line normal to the surface of the face glass to which the phosphor elements are mounted at a distance r from the optical axis is less than r/250.

24. The optical system of claim 23, wherein γ is less than r/500.

25. An optical system for projecting an image, comprising:
   a cathode ray tube having a face glass, said face glass having a convex surface to which are mounted a plurality of phosphor elements, said surface of said face glass to which said phosphor elements are mounted being aspheric and of greatest radius at the optical axis and lesser radius radially outward thereof;
   a first aspheric lens of relatively weak power;
   a second biconvex lens for providing the major portion of the enlargement provided by the lens system;
   a third aspheric lens of relatively weak positive power; and
   a fourth lens with a concave face on its screen side of relatively large negative power;
   wherein the distance z along the optical axis between the surface of said face glass tow hcih said phosphor elements are mounted and a plane including the outermost surface of said face glass at a distance $r_{max}$ from the optical axis is less than $r_{max}^2/1000$ and wherein z and $r_{max}$ are measured in mm.

26. A projection television, comprising a cathode ray tube having a face glass, an internal surface of said face glass to which phosphor elements are mounted being convex and aspheric, wherein the radius of said face glass is greatest at its center portion and decreases radially outwardly thereof, and a projection optical system, said projection optical system comprising a lens means to project an image formed on said face glass onto a projection screen, said lens means comprising, from the screen:
   a first aspheric lens;
   a second biconvex positive lens;
   a third aspheric positive lens; and
   a fourth negative lens;
   wherein an angle γ formed between the optical axis and a line normal to the surface of the face glass to which the phosphor elements are mounted at a distance r from the optical axis is less than r/250.

27. The optical system of claim 26, wherein γ is less than r/500.

28. A projection television, comprising a cathode ray tube having a face glass, an internal surface of said face glass to which phosphor elements are mounted being convex and aspheric, wherein the radius of said face glass is greatest at its center portion and decreases radially outwardly thereof, and a projection optical system, said projection optical system comprising a lens means to project an image formed on said face glass onto a projection screen, wherein the distance z along the optical axis between the surface of said face glass to which said phosphor elements are mounted and a plane including the outermost surface of said face glass at a distance $r_{max}$ from the optical axis is less than $r_{max}^2/1000$, and wherein z and $r_{max}$ are measured in like units.

* * * * *